(12) United States Patent
Tong et al.

(10) Patent No.: US 11,405,930 B2
(45) Date of Patent: Aug. 2, 2022

(54) MEASUREMENT METHOD, NETWORK DEVICE, AND TERMINAL DEVICE

(71) Applicant: Huawei Technologies Co., Ltd., Shenzhen (CN)

(72) Inventors: Jichao Tong, Chengdu (CN); Hui Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 16/833,190

(22) Filed: Mar. 27, 2020

(65) Prior Publication Data

US 2020/0229201 A1 Jul. 16, 2020

Related U.S. Application Data

(63) Continuation of application No. PCT/CN2017/104280, filed on Sep. 29, 2017.

(51) Int. Cl.
*H04W 72/08* (2009.01)

(52) U.S. Cl.
CPC ....... *H04W 72/085* (2013.01); *H04W 72/082* (2013.01)

(58) Field of Classification Search
CPC .......................... H04W 72/085; H04W 72/082
See application file for complete search history.

(56) References Cited

U.S. PATENT DOCUMENTS

2013/0242773 A1* 9/2013 Wernersson ......... H04B 7/0632
370/252

2013/0343299 A1 12/2013 Sayana et al.
(Continued)

FOREIGN PATENT DOCUMENTS

CN 104247289 A 12/2014
CN 106452544 A 2/2017
(Continued)

OTHER PUBLICATIONS

"On the channel reciprocity support for CSI acquisition," 3GPP TSG-RAN WG1 NR Ad-Hoc#3, Nagoya, Japan, R1-1716502, XP051339955, Total 5 pages, 3rd Generation Partnership Project, Valbonne, France (Sep. 18-21, 2017).

(Continued)

*Primary Examiner* — Ayanah S George
(74) *Attorney, Agent, or Firm* — Leydig, Voit & Mayer, Ltd.

(57) ABSTRACT

A measurement method, a terminal device, and a network device are described. The measurement operation includes sending a channel state information-reference signal CSI-RS measurement beam to a terminal device. The CSI-RS measurement beam is obtained by the network device by weighting a CSI-RS by using a beamforming weight, and the beamforming weight is used to perform beamforming on the CSI-RS. The measurement operation further includes receiving a rank indicator and a channel quality indicator that are determined based on the CSI-RS measurement beam. The measurement operation further includes weighting and transmitting a downlink channel based on the rank indicator and the channel quality indicator. The CSI-RS is weighted and transmitted by using the beamforming weight, to help improve accuracy of rank measurement, thereby improving a user throughput.

8 Claims, 4 Drawing Sheets

(56) References Cited

U.S. PATENT DOCUMENTS

| | | | |
|---|---|---|---|
| 2014/0192917 A1* | 7/2014 | Nam | H04L 1/0026 |
| | | | 375/267 |
| 2016/0134352 A1 | 5/2016 | Stirling-Gallacher | |
| 2017/0214505 A1 | 7/2017 | Zhang et al. | |
| 2017/0222693 A1* | 8/2017 | Shen | H04L 5/0048 |
| 2017/0317866 A1* | 11/2017 | Stirling-Gallacher | |
| | | | H04L 5/0048 |
| 2018/0034527 A1* | 2/2018 | Noh | H04L 5/0048 |

FOREIGN PATENT DOCUMENTS

| | | | |
|---|---|---|---|
| CN | 106686620 A | 5/2017 | |
| CN | 107204794 A | 9/2017 | |
| CN | 107210801 A | 9/2017 | |
| WO | 2016163843 A1 | 10/2016 | |
| WO | 2017078798 A1 | 5/2017 | |

OTHER PUBLICATIONS

"Details of CSI Measurement," 3GPP TSG RAN WG1 NR Ad-Hoc #3, Nagoya, Japan, R1-1716394, XP051339849, pp. 1-5, 3rd Generation Partnership Project, Valbonne, France (Sep. 18-21, 2017).

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.4.0, total 753 pages. 3rd Generation Partnership Project, Valbonne, France (Sep. 2017).

* cited by examiner

MEASUREMENT METHOD, NETWORK DEVICE, AND TERMINAL DEVICE

CROSS-REFERENCE TO RELATED APPLICATIONS

This application is a continuation of International Application No. PCT/CN2017/104280, filed on Sep. 29, 2017, the disclosure of which is hereby incorporated by reference in its entirety.

TECHNICAL FIELD

This application relates to the communications field, and more specifically, to a measurement method, a network device, and a terminal device.

BACKGROUND

In a downlink scheduling process, a network device needs to send a measurement pilot, so that a terminal device measures the measurement pilot and feeds back necessary measurement quantities (e.g., a channel quality indicator (CQI) or a rank indicator (RI)). These measurement quantities are used as basic input for downlink scheduling to provide a basis for the scheduling. Accuracy of the measurement quantities directly affects an end user throughput and a cell throughput.

Currently, although rank calculation is supported on a terminal side and a network side, an error is introduced when the terminal device and the network device measure a rank, leading to an inaccurate measured rank. Consequently, the downlink scheduling process of the network device is affected.

Therefore, how to improve rank accuracy in downlink scheduling becomes an urgent problem to be resolved.

SUMMARY

This application provides a measurement method, a network device, and a terminal device, to weight and transmit a CSI-RS by using a beamforming weight, to help the terminal device improve accuracy of rank measurement, thereby improving a throughput of a user.

According to a first aspect, a measurement method is provided. The method includes: receiving, by a terminal device, a channel state information-reference signal CSI-RS measurement beam sent by a network device, where the CSI-RS measurement beam is obtained by the network device by weighting a CSI-RS by using a beamforming weight, and the beamforming weight is used to perform beamforming on the CSI-RS; determining, by the terminal device, a rank indicator and a channel quality indicator based on the CSI-RS measurement beam; and sending, by the terminal device, the rank indicator and the channel quality indicator to the network device, so that the network device weights and transmits a downlink channel based on the rank indicator and the channel quality indicator.

In the measurement method in this embodiment of this application, the CSI-RS is weighted and transmitted by using the beamforming weight, to help improve accuracy of rank measurement, thereby improving a user throughput.

With reference to the first aspect, in some implementations of the first aspect, the determining, by the terminal device, a rank indicator and a channel quality indicator based on the CSI-RS measurement beam includes: determining, by the terminal device, a downlink CSI-RS channel matrix based on the CSI-RS measurement beam; determining, by the terminal device, a first codebook from a first codebook set based on the downlink CSI-RS channel matrix, where the first codebook set includes a block identity matrix codebook and/or a precoding matrix indicator PMI codebook; and determining the rank indicator and the channel quality indicator based on the first codebook.

In some possible implementations, the first codebook is a codebook that has a maximum channel capacity and that is obtained by weighting the downlink CSI-RS channel matrix.

In some possible implementations, the terminal device weights a downlink CSI-RS channel by using the block identity matrix codebook and the precoding matrix indicator codebook, to determine the first codebook.

In some possible implementations, the precoding matrix indicator codebook includes but is not limited to a type 1 codebook defined in a 3GPP R15 protocol, a codebook that combines a type 1 and a type 2 and that is defined in a 3GPP R15 protocol, and other codebooks defined in a 3GPP R8 protocol.

In some possible implementations, a quantity of CSI-RS ports is 8, and the block identity matrix codebook includes:

$$\begin{pmatrix}1\\0\\0\\0\\0\\0\\0\\0\end{pmatrix}_{8\times 1}, \begin{pmatrix}1&0\\0&1\\0&0\\0&0\\0&0\\0&0\\0&0\\0&0\end{pmatrix}_{8\times 2}, \begin{pmatrix}1&0&0\\0&1&0\\0&0&1\\0&0&0\\0&0&0\\0&0&0\\0&0&0\\0&0&0\end{pmatrix}_{8\times 3}, \begin{pmatrix}1&0&0&0\\0&1&0&0\\0&0&1&0\\0&0&0&1\\0&0&0&0\\0&0&0&0\\0&0&0&0\\0&0&0&0\end{pmatrix}_{8\times 4}$$

$$\begin{pmatrix}1&0&0&0&0\\0&1&0&0&0\\0&0&1&0&0\\0&0&0&1&0\\0&0&0&0&1\\0&0&0&0&0\\0&0&0&0&0\\0&0&0&0&0\end{pmatrix}_{8\times 5}, \begin{pmatrix}1&0&0&0&0&0\\0&1&0&0&0&0\\0&0&1&0&0&0\\0&0&0&1&0&0\\0&0&0&0&1&0\\0&0&0&0&0&1\\0&0&0&0&0&0\\0&0&0&0&0&0\end{pmatrix}_{8\times 6}$$

$$\begin{pmatrix}1&0&0&0&0&0&0\\0&1&0&0&0&0&0\\0&0&1&0&0&0&0\\0&0&0&1&0&0&0\\0&0&0&0&1&0&0\\0&0&0&0&0&1&0\\0&0&0&0&0&0&1\\0&0&0&0&0&0&0\end{pmatrix}_{8\times 7}, \begin{pmatrix}1&0&0&0&0&0&0&0\\0&1&0&0&0&0&0&0\\0&0&1&0&0&0&0&0\\0&0&0&1&0&0&0&0\\0&0&0&0&1&0&0&0\\0&0&0&0&0&1&0&0\\0&0&0&0&0&0&1&0\\0&0&0&0&0&0&0&1\end{pmatrix}_{8\times 8}$$

With reference to the first aspect, in some implementations of the first aspect, before the determining, by the terminal device, a first codebook based on the downlink CSI-RS channel matrix, the method further includes: receiving, by the terminal device, indication information sent by the network device, where the indication information is used to indicate the quantity of CSI-RS ports; and determining, by the terminal device, the first codebook set based on the indication information.

In some possible implementations, the terminal device determines the block identity matrix codebook in the first codebook set based on the quantity of CSI-RS ports carried in the indication information.

According to a second aspect, a measurement method is provided. The method includes: sending, by a network device, a channel state information-reference signal CSI-RS measurement beam to a terminal device, where the CSI-RS measurement beam is obtained by the network device by weighting a CSI-RS by using a beamforming weight, and the beamforming weight is used to perform beamforming on the CSI-RS; receiving, by the network device, a rank indicator and a channel quality indicator that are determined by the terminal device based on the CSI-RS measurement beam; and weighting and transmitting, by the network device, a downlink channel based on the rank indicator and the channel quality indicator.

In the measurement method in this embodiment of this application, the CSI-RS is weighted and transmitted by using the beamforming weight, to help improve accuracy of rank measurement, thereby improving a user throughput.

With reference to the second aspect, in some implementations of the first aspect, the method further includes: sending, by the network device, indication information to the terminal device, where the indication information is used to indicate a quantity of CSI-RS ports.

With reference to the second aspect, in some implementations of the first aspect, before the sending, by the network device, indication information to the terminal device, the method further includes: determining, by the network device, the quantity of CSI-RS ports based on a quantity of receive antennas of the terminal device; or determining, by the network device, the quantity of CSI-RS ports based on load of a cell; or determining, by the network device, the quantity of CSI-RS ports based on a distance between the network device and the terminal device.

With reference to the second aspect, in some implementations of the first aspect, before the sending, by a network device, a channel state information-reference signal CSI-RS measurement beam to a terminal device, the method further includes: receiving, by the network device, an uplink sounding reference signal SRS sent by the terminal device; and determining, by the network device, the beamforming weight based on the SRS.

According to a third aspect, a terminal device is provided. The terminal device includes: a transceiver module, configured to receive a channel state information-reference signal CSI-RS measurement beam sent by a network device, where the CSI-RS measurement beam is obtained by the network device by weighting a CSI-RS by using a beamforming weight, and the beamforming weight is used to perform beamforming on the CSI-RS; and a processing module, configured to determine a rank indicator and a channel quality indicator based on the CSI-RS measurement beam, where the transceiver module is further configured to send the rank indicator and the channel quality indicator to the network device, so that the network device weights and transmits a downlink channel based on the rank indicator and the channel quality indicator.

With reference to the third aspect, in some implementations of the first aspect, the processing module is specifically configured to: determine a downlink CSI-RS channel matrix based on the CSI-RS measurement beam; and determine a first codebook from a first codebook set based on the downlink CSI-RS channel matrix, where the first codebook set includes a block identity matrix codebook and/or a precoding matrix indicator PMI codebook; and determine the rank indicator and the channel quality indicator based on the first codebook.

In some possible implementations, the first codebook is a codebook that has a maximum channel capacity and that is obtained by weighting the downlink CSI-RS channel matrix.

With reference to the third aspect, in some implementations of the first aspect, the transceiver module is further configured to receive indication information sent by the network device, where the indication information is used to indicate a quantity of CSI-RS ports; and the processing module is further configured to determine the first codebook set based on the indication information.

The terminal device in this embodiment of this application weights and transmits the CSI-RS by using the beamforming weight, to help improve accuracy of rank measurement, thereby improving a user throughput.

According to a fourth aspect, a network device is provided. The network device includes: a transceiver module, configured to send a channel state information-reference signal CSI-RS measurement beam to a terminal device, where the CSI-RS measurement beam is obtained by the network device by weighting a CSI-RS by using a beamforming weight, and the beamforming weight is used to perform beamforming on the CSI-RS, where the transceiver module is further configured to receive a rank indicator and a channel quality indicator that are determined by the terminal device based on the CSI-RS measurement beam; and a processing module, configured to weight and transmit a downlink channel based on the rank indicator and the channel quality indicator.

With reference to the fourth aspect, in some implementations of the first aspect, the transceiver module is further configured to send indication information to the terminal device, where the indication information is used to indicate a quantity of CSI-RS ports.

With reference to the fourth aspect, in some implementations of the first aspect, the processing module is further configured to: determine the quantity of CSI-RS ports based on a quantity of receive antennas of the terminal device; or determine the quantity of CSI-RS ports based on load of a cell in which the terminal device is located; or determine the quantity of CSI-RS ports based on a distance between the network device and the terminal device.

With reference to the fourth aspect, in some implementations of the first aspect, the transceiver module is further configured to receive an uplink sounding reference signal SRS sent by the terminal device; and the processing module is further configured to determine the beamforming weight based on the SRS.

The network device in this embodiment of this application weights and transmits the CSI-RS by using the beamforming weight, to help improve accuracy of rank measurement, thereby improving a user throughput.

According to a fifth aspect, a terminal device is provided. The terminal device includes a memory and a processor, where the memory is configured to store an instruction, and the processor is configured to invoke the instruction in the memory, to perform operations in the method according to any one of the first aspect or the possible implementations of the first aspect.

According to a sixth aspect, a network device is provided. The network device includes a memory and a processor, where the memory is configured to store an instruction, and the processor is configured to invoke the instruction in the memory, to perform operations in the method according to any one of the second aspect or the possible implementations of the second aspect.

According to a seventh aspect, a communications system is provided. The communications system includes a terminal device and/or a network device, where the terminal device is the terminal device according to any one of the third aspect, the fifth aspect, or the possible implementations of the third aspect and the fifth aspect, and the network device is the network device according to any one of the fourth aspect, the sixth aspect, or the possible implementations of the fourth aspect and the sixth aspect.

According to an eighth aspect, a computer-readable storage medium is provided. The computer-readable storage medium stores an instruction. When the instruction is run on a computer, the computer is enabled to perform the methods according to the foregoing aspects.

According to a ninth aspect, a system on chip is provided. The system on chip includes an input/output interface, at least one processor, at least one memory, and a bus. The at least one memory is configured to store an instruction, and the at least one processor is configured to invoke the instruction in the at least one memory, to perform operations in the methods according to the foregoing aspects.

DESCRIPTION OF EMBODIMENTS

The following describes technical solutions of this application with reference to accompanying drawings.

The technical solutions of the embodiments of this application may be applied to various communications systems, e.g., a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a fifth generation (5G) system, or a new radio (NR) system in future.

A terminal device in the embodiments of this application may be referred to as user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

Figure 1:
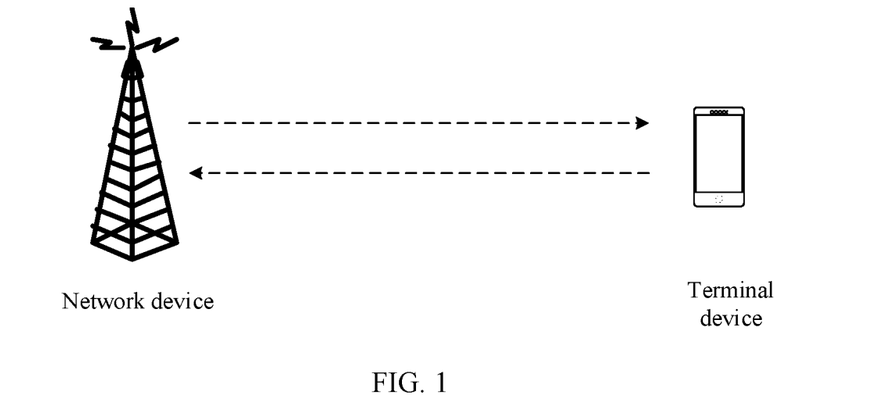
FIG. 1 is an application scenario of a technical solution according to an embodiment of this application.

FIG. 1 shows an application scenario of a technical solution according to an embodiment of this application. As shown in FIG. 1, in a downlink scheduling process, a network device needs to send a measurement beam, so that a terminal device measures and feeds back necessary measurement quantities, e.g., a rank indicator (RI) and a channel quality indicator (CQI). These measurement quantities are used as basic input for downlink scheduling to provide a basic basis for scheduling.

It should be understood that, the technical solution in this embodiment of this application may be applied to a digital beamforming (DBF) architecture, and a CQI and a rank perform measurement by using a CSI-RS weighted by a beamforming weight (a quantity of channel state information-reference signal (CSI-RS) ports can be allocated). Alternatively, the technical solution may be applied to a hybrid beamforming (HBF) architecture, a CQI and a rank perform measurement based on a CSI-RS weighted by a beamforming weight (a quantity of CSI-RS ports may be allocated) on a basis of an analog beam.

The following uses a DBF architecture with 64 transmit and receive channels (TRX) as an example (a solution is the same in an HBF architecture and a difference is that uplink and downlink channels in a digital domain in the HBF architecture are channels weighted by analog beams).

Figure 2:
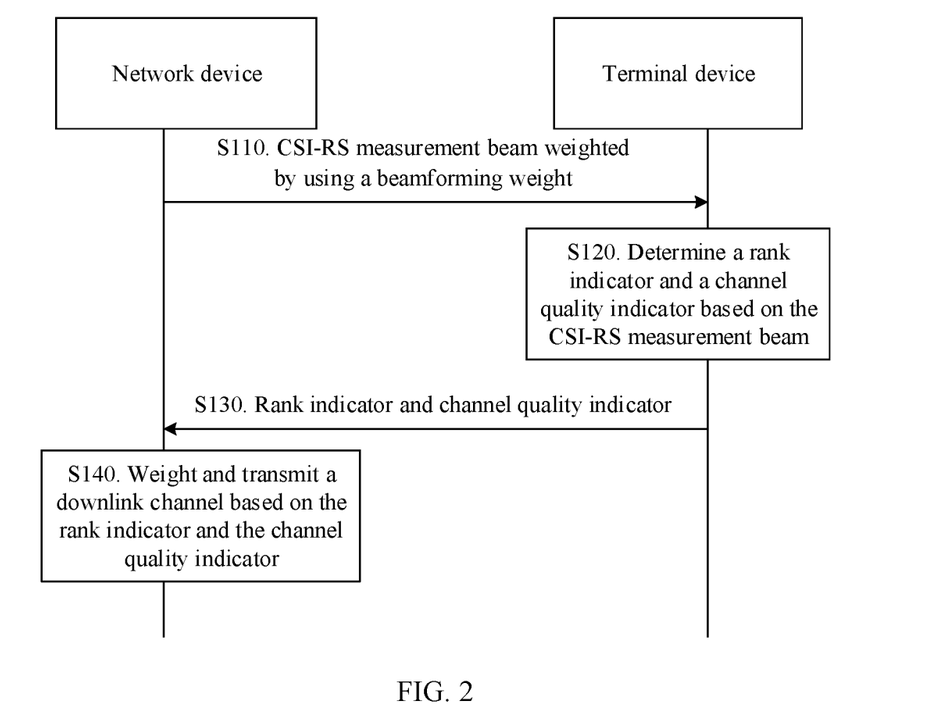
FIG. 2 is a schematic flowchart of a measurement method according to an embodiment of this application.

FIG. 2 is a schematic flowchart of a measurement method 100 according to an embodiment of this application. As shown in FIG. 2, the method 100 includes the following steps.

S110. A network device sends a channel state information-reference signal CSI-RS measurement beam to a terminal device, where the CSI-RS measurement beam is obtained by the network device by weighting a CSI-RS by using a beamforming weight, and the beamforming weight is used to perform beamforming on the CSI-RS.

Optionally, before the sending, by a network device, a channel state information-reference signal CSI-RS measurement beam to a terminal device, the method 100 further includes:

receiving, by the network device, an uplink sounding reference signal SRS sent by the terminal device; and
determining, by the network device, the beamforming weight based on the SRS.

Specifically, the network device may determine the beamforming weight based on the SRS sent by the terminal device.

Figure 3:
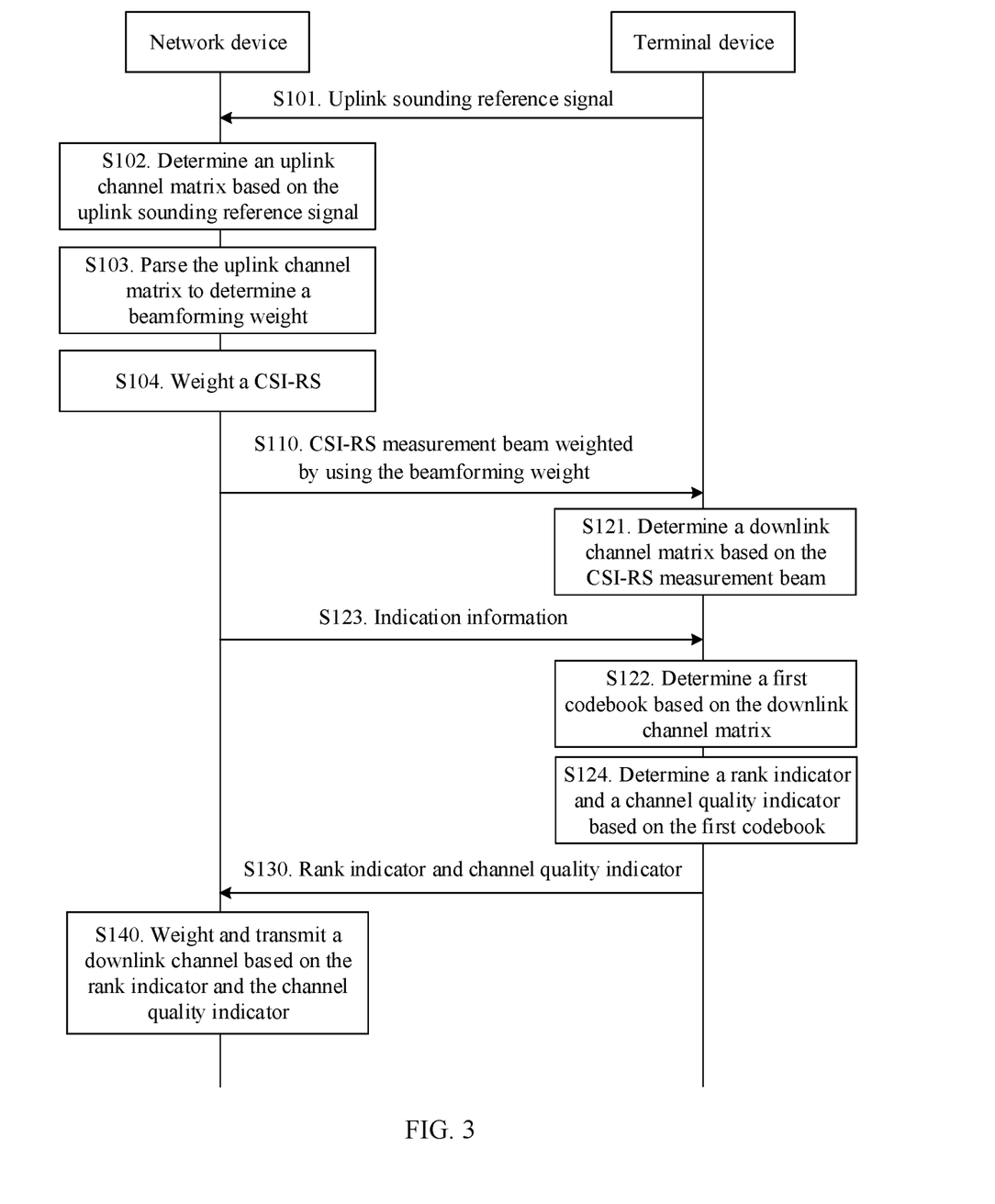
FIG. 3 is another schematic flowchart of a measurement method according to an embodiment of this application.

FIG. 3 is another schematic flowchart of the measurement method 100 according to an embodiment of this application. As shown in FIG. 3, the method 100 includes the following steps.

S101. The network device receives the SRS sent by the terminal device.

S102. The network device determines an uplink channel matrix $H_{uplink\ UE\_port \times 64}$ based on the SRS.

Specifically, the network device obtains the uplink channel matrix $H_{uplink\ UE\_port \times 64}$ through measurement based on the uplink SRS sent by the terminal device, where UE_port represents a total quantity of ports of the terminal device, and 64 is a quantity of TRXs of the network device. Herein, 64TRX is commonly used for simplification, but this dimension varies with the quantity of TRXs of the network device.

S103. The network device decomposes the uplink channel matrix to obtain a beamforming weight.

Specifically, the network device performs singular value decomposition (SVD) on the uplink channel matrix to obtain a first beamforming weight $R_{UE\_port \times 64}$, where $$H_{uplinkUE\_port \times 64} = U_{UE\_port \times UE\_port} \Sigma_{UE\_port \times UE\_port} (R_{UE\_port \times 64})^H \quad (1)$$

The foregoing formula is an SVD decomposition formula, and meanings of UE_port and 64 in the matrix dimension are the same as those in step S202.

S104. The network device weights a CSI-RS by using the beamforming weight.

Specifically, the network device obtains the beamforming weight by performing S203, weights the CSI-RS, and sends a channel state information-reference signal CSI-RS measurement beam to the terminal device.

S120. The terminal device determines a rank indicator and a channel quality indicator based on the CSI-RS measurement beam.

Specifically, after receiving the CSI-RS measurement beam sent by the network device, the terminal device measures the CSI-RS, determines the rank indicator and the CQI, and feeds back the rank indicator and the CQI to the network device.

Optionally, the determining, by the terminal device, a rank indicator and a channel quality indicator based on the CSI-RS measurement beam includes:

determining, by the terminal device, a downlink CSI-RS channel matrix based on the CSI-RS measurement beam;

determining, by the terminal device, a first codebook from a first codebook set based on the downlink CSI-RS channel matrix, where the first codebook set includes a block identity matrix codebook and/or a precoding matrix indicator PMI codebook; and determining the rank indicator and the channel quality indicator based on the first codebook.

Optionally, the first codebook is a codebook that has a maximum channel capacity and that is obtained by weighting the downlink CSI-RS channel matrix.

Optionally, the precoding matrix indicator codebook includes but is not limited to a type 1 codebook defined in a 3GPP R15 protocol, a codebook that is obtained by combining a type 1 codebook and a type 2 codebook and that is defined in a 3GPP R15 protocol, and other codebooks defined in a 3GPP R8 protocol.

As shown in FIG. 3, the method 100 further includes the following steps.

S121. The terminal device determines a downlink channel matrix based on the CSI-RS measurement beam.

Specifically, after receiving the CSI-RS measurement beam, the terminal device obtains an equivalent downlink CSI-RS channel matrix. In measurement, the equivalent downlink CSI-RS channel matrix is as follows:

$$H_{uplinkUE\_port \times 64} R_{UE\_port \times \Gamma}$$

Meanings of UE_port and 64 in the matrix dimension in the foregoing formula are the same as those in step S202.

S122. The terminal device determines the first codebook from the first codebook set based on the downlink channel matrix.

The following uses eight ports as an example.

In a specific embodiment, in a case of power balancing, it is assumed that beamforming weight measurement is accurate and a channel at an SRS transmission moment is similar to that at a data transmission scheduling moment. In this case, a weight solution in which a channel capacity is optimal can be definitely found based on the beamforming weight, that is:

$$C(H_{uplinkUE\_port \times 64} R_{UE\_port \times 64} W_{8 \times Rank}) \geq \\ C(H_{uplinkUE\_port \times 64} R_{UE\_port \times 64} W_{PMI8 \times Rank}) \quad (2)$$

$H_{uplinkUE\_port \times 64} R_{UE\_port \times 64}$ is a downlink CSI-RS channel estimated by the terminal device, and meanings of UE_port and 64 in the matrix dimension are the same as those in step S202. The terminal device may not traverse an original set of precoding matrix indicator (Precoding Matrix Indicator, PMI) codebooks $W_{PMI8 \times Rank}$, but only needs to traverse a newly-added set of block identity matrix codebooks $W_{8 \times Rank}$ that include different ranks and that uses an 8-port configuration in the first codebook set:

$$\begin{pmatrix} 1 \\ 0 \\ 0 \\ 0 \\ 0 \\ 0 \\ 0 \\ 0 \end{pmatrix}_{8 \times 1} \begin{pmatrix} 1 & 0 \\ 0 & 1 \\ 0 & 0 \\ 0 & 0 \\ 0 & 0 \\ 0 & 0 \\ 0 & 0 \\ 0 & 0 \end{pmatrix}_{8 \times 2} \begin{pmatrix} 1 & 0 & 0 \\ 0 & 1 & 0 \\ 0 & 0 & 1 \\ 0 & 0 & 0 \\ 0 & 0 & 0 \\ 0 & 0 & 0 \\ 0 & 0 & 0 \\ 0 & 0 & 0 \end{pmatrix}_{8 \times 3} \begin{pmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{pmatrix}_{8 \times 4}$$

$$\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ 0 & 0 & 0 & 0 & 0 \\ 0 & 0 & 0 & 0 & 0 \\ 0 & 0 & 0 & 0 & 0 \end{pmatrix}_{8 \times 5} \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{pmatrix}_{8 \times 6}$$

$$\begin{pmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 0 & 0 & 0 & 0 & 0 & 0 & 0 \end{pmatrix}_{8 \times 7} \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}_{8 \times 8}$$

The terminal device weights a downlink channel by traversing the foregoing eight block identity matrix codebooks in the first codebook set, to obtain channel matrices of different ranks:

$$H_{uplinkUE\_port \times 64} R_{UE\_port \times 64} W_{8 \times Rank}$$

A codebook that can satisfy the maximized channel capacity, that is, the first codebook $W_{opt}$, is selected from the eight block identity matrix codebooks.

It should be understood that the first codebook may be determined by traversing the foregoing block identity matrix codebook and/or the foregoing PMI codebook by the terminal device, and selecting, as the first codebook, a codebook that can satisfy the maximized channel capacity. Alternatively, the first codebook may be determined in another manner. This application is not limited thereto.

For example, another method for determining the first codebook is: performing, by the terminal device, SVD decomposition on the downlink CSI-RS channel matrix to obtain a right unitary matrix, and determining, by the terminal device from the foregoing block identity matrix codebooks in the first codebook set, a codebook that has highest correlation with the right unitary matrix as the first codebook.

In another specific embodiment, similar to the foregoing specific embodiment, a block identity matrix codebook needs to be newly added on the terminal device side. However, considering a constraint on measurement accuracy of the first beamforming weight, assuming that the first beamforming weight is not optimal, after a PMI codebook on the terminal device side is corrected, a capacity can be further improved.

Therefore, it is necessary for the terminal device to traverse the original PMI codebook. Based on the original PMI codebook, in the solution of this embodiment, a set of block identity matrix codebooks $W_{8 \times Rank}$ that include the foregoing different ranks is also newly added.

The terminal device weights the downlink channel by traversing the set of PMI codebooks $W_{PMI8 \times Rank}$ and the set of block identity matrix codebooks $W_{8 \times Rank}$ in the first codebook set, to obtain channel matrices of different ranks:

$$H_{uplinkUE\_port \times 64} R_{UE\_port \times 64} W_{PMI8 \times Rank}, \text{ or}$$
$$H_{uplinkUE\_pr \times 64} R_{UE\_port \times 64} W_{8 \times Rank}$$

A codebook that can satisfy the maximized channel capacity, that is, the first codebook $W_{opt}$, is selected from the codebooks.

Optionally, another method for determining the first codebook is: performing, by the terminal device, SVD decomposition on the downlink CSI-RS channel matrix to obtain a right unitary matrix, and determining, by the terminal device from the foregoing block identity matrix codebook and the foregoing PMI codebook in the first codebook set, a codebook that has highest correlation with the right unitary matrix as the first codebook.

Optionally, before the determining, by the terminal device, a first codebook, the method 100 further includes the following steps.

S123. The network device sends indication information to the terminal device, where the indication information is used to indicate a quantity of CSI-RS ports to the terminal device.

Specifically, the indication information that is sent by the network device and that is received by the terminal device carries the quantity of CSI-RS ports, and the terminal device determines the set of block identity matrix codebooks based on the quantity of CSI-RS ports.

For example, if the quantity of CSI-RS ports carried in the indication information is 8, the set of block identity matrix codebooks $W_{8 \times Rank}$ may be used.

For another example, if the quantity of CSI-RS ports carried in the indication information is 4, the following set of block identity matrix codebooks $W_{4 \times Rank}$ may be used:

$$\begin{pmatrix} 1 \\ 0 \\ 0 \\ 0 \end{pmatrix}_{4 \times 1}, \begin{pmatrix} 1 & 0 \\ 0 & 1 \\ 0 & 0 \\ 0 & 0 \end{pmatrix}_{4 \times 2}, \begin{pmatrix} 1 & 0 & 0 \\ 0 & 1 & 0 \\ 0 & 0 & 1 \\ 0 & 0 & 0 \end{pmatrix}_{4 \times 3}, \begin{pmatrix} 1 & 0 & 0 & 0 \\ 0 & 1 & 0 & 0 \\ 0 & 0 & 1 & 0 \\ 0 & 0 & 0 & 1 \end{pmatrix}_{4 \times 4}$$

Optionally, before the sending, by the network device, indication information to the terminal device, the method further includes:

determining, by the network device, the quantity of CSI-RS ports based on a quantity of receive antennas of the terminal device; or determining, by the network device, the quantity of CSI-RS ports based on load of a cell in which the terminal device is located; or determining, by the network device, the quantity of CSI-RS ports based on a distance between the network device and the terminal device.

S124. The terminal device determines the RI and the CQI based on the first codebook.

Specifically, after the terminal device weights an equivalent CSI-RS matrix by traversing the set of PMI codebooks $W_{PMI8 \times Rank}$ and/or the set of block identity matrix codebooks $W_{8 \times Rank}$ to determine the first codebook $W_{opt}$, a rank corresponding to the first codebook $W_{opt}$ is an optimal rank obtained by the terminal device through measurement. The equivalent matrix $H_{uplinkUE\_port \times 64} R_{UE\_port \times 64} W_{opt}$ may be processed by using a minimum mean square error (MMSE) receiver, to obtain a signal to interference plus noise ratio (SINR) of each stream, SINRs of streams corresponding to all codewords are averaged and quantized to obtain a codeword-level CQI, an RI and a CQI are sent to the network device after calculation is completed, and the rank indicator and the CQI that are obtained through calculation are fed back to the network device.

It should be understood that after determining the first codebook, the terminal device may perform a filtering operation on the first codebook to obtain a codebook that undergoes filtering, and use a rank corresponding to the codebook that undergoes filtering as the optimal rank obtained by the terminal device through measurement.

S130. The terminal device sends the rank indicator and the channel quality indicator to the network device.

S140. The network device weights a downlink channel based on the rank indicator and the channel quality indicator, and transmits the downlink channel.

Specifically, when the network device needs to perform downlink scheduling, the network device sends the CSI-RS measurement beam to the terminal device. The CSI-RS measurement beam is obtained by the network device by weighting the CSI-RS by using the first beamforming weight. After receiving the CSI-RS measurement beam from the network device, the terminal device performs measurement by using the CSI-RS to obtain the rank indicator and the CQI, and feeds back the obtained rank indicator and CQI to the network device. The network device restricts a beamforming weight based on the rank indicator fed back by the terminal device to obtain a second beamforming weight, and weights and transmits the downlink channel by using the second beamforming weight during data transmission. The network device determines a modulation and coding scheme (MCS) for a codeword based on the CQI.

It should be understood that, for a same channel, a larger antenna array gain can be obtained by using the beamforming weight compared with a static beam (such as a DFT weight) weight. Therefore, weighting based on the beamforming weight may be applied to all pilots and channels that support a user-level configuration. For example, the foregoing downlink channel may be a physical downlink shared channel (PDSCH), a physical downlink control channel (PDCCH), and the like. Further, the weighting based on the beamforming weight may be applied to an uplink channel, e.g., a physical uplink shared channel (PUSCH), a physical uplink control channel (PUCCH), and the like.

It should be further understood that, in a multi-user scenario, to improve a measurement speed, when a CSI-RS is weighted based on the beamforming weight, measurement beam pairing between a plurality of users may be considered to be performed. CSI-RS weighting manners for different users may be different. For example, some CSI-RS weighting manners may be static beam weighting, and some CSI-RS weighting manners may be weighting based on beamforming weight. Interference between users after the pairing is corrected by using a zero forcing algorithm.

Before a long term evolution (LTE) transmission mode TM9 is used, measurement is performed by using a cell reference signal (CRS) pilot. When a beamforming (BF) weighting manner of a physical downlink shared channel (PDSCH) is uplink sounding reference signal (SRS) weighting (matrix singular value decomposition (SVD) is performed on the SRS, to obtain an eigenvector), a CQI and a rank (Rank) cannot be accurately obtained through measurement. This is because a CRS is a cell-level pilot signal, a quantity of antennas (ports) is limited, and only transmission by using a wide beam is supported. Consequently, a channel cannot match a PDSCH channel that is obtained after beamforming. When measurement performed by the terminal device is inaccurate, the rank can be calculated only on a network side. However, an error is relatively large when prediction is performed on the network side.

A channel state information-reference signal that is used for downlink measurement in a new radio (NR) technology and that is introduced after LTE TM9 can support user-level beamforming weighting, thereby bringing great flexibility to measurement. Different beamforming weighting manners and measurement configurations of the CSI-RS may form a plurality of measurement solutions, and the measurement solutions are flexibly applied to different scenarios.

In the measurement method in the embodiments of this application, the CSI-RS is weighted and transmitted by using the beamforming weight, to help improve accuracy of rank measurement, thereby improving a user throughput.

In a specific implementation, the following describes a case in which a PDSCH weight scheme configured by the network device for a user is a beamforming weight.

(1) The terminal device successfully accesses a cell in which the technical solution in the embodiments of this application takes effect, and access manners include initial access, re-access, handover, and the like.

(2) The PDSCH weight scheme configured by the network device for the terminal device is the beamforming weight (that is, a downlink beamforming weight scheme obtained by using uplink channel information based on uplink and downlink reciprocity in a time division duplex (TDD) system).

(3) After all SRSs of the terminal device are reported, the network device calculates the beamforming weight, and weights and transmits the CSI-RS by using the beamforming weight. A quantity of CSI-RS ports is determined by using a maximum quantity of streams supported by the user and a quantity of currently to-be-measured terminal devices.

(4) The terminal device performs measurement, and after the measurement is completed, feeds back an RI and a CQI to the network device by using a PUCCH or a PUSCH.

(5) The network device determines a rank of the terminal device based on a rank value indicated in the RI that is fed back by the terminal device, selects a beamforming weight eigenvector matching the rank value as a final beamforming weight, and weights and transmits a PDSCH.

In the measurement method in the embodiments of this application, in a low- and medium-rate scenario in which a channel slowly changes, accuracy of CQI and rank measurement, especially accuracy of a rank, can be ensured by ensuring a channel that weighted based on the beamforming weight to be consistent with a downlink data transmission channel, thereby improving a throughput for responding to the terminal device.

The foregoing describes in detail the measurement method in the embodiments of this application with reference to FIG. 2 and FIG. 3. The following describes in detail a terminal device and a network device in the embodiments of this application with reference to FIG. 4 to FIG. 7.

Figure 4:
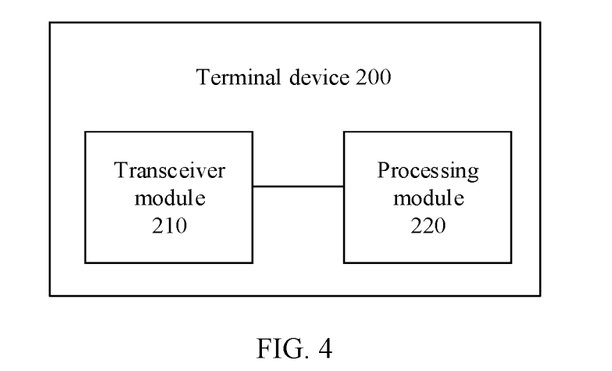
FIG. 4 is a schematic block diagram of a terminal device according to an embodiment of this application.

FIG. 4 is a schematic block diagram of a terminal device 200 according to an embodiment of this application. As shown in FIG. 4, the terminal device 200 includes: a transceiver module 210, configured to receive a channel state information-reference signal CSI-RS measurement beam sent by a network device, where the CSI-RS measurement beam is obtained by the network device by weighting a CSI-RS by using a beamforming weight, and the beamforming weight is used to perform beamforming on the CSI-RS; and a processing module 220, configured to determine a rank indicator and a channel quality indicator based on the CSI-RS measurement beam, where the transceiver module 210 is further configured to send the rank indicator and the channel quality indicator to the network device, so that the network device weights and transmits a downlink channel based on the rank indicator and the channel quality indicator.

Optionally, the processing module 220 is specifically configured to: determine a downlink CSI-RS channel matrix based on the CSI-RS measurement beam; determine a first codebook from a first codebook set based on the downlink CSI-RS channel matrix, where the first codebook set includes a block identity matrix codebook and/or a precoding matrix indicator PMI codebook; and determine the rank indicator and the channel quality indicator based on the first codebook.

Optionally, the first codebook is a codebook that has a maximum channel capacity and that is obtained by weighting the downlink CSI-RS channel matrix.

Optionally, the precoding matrix indicator codebook includes but is not limited to a type 1 codebook defined in a 3GPP R15 protocol, a codebook that combines a type 1 and a type 2 and that is defined in a 3GPP R15 protocol, and other codebooks defined in a 3GPP R8 protocol.

Optionally, the transceiver module 210 is further configured to receive indication information sent by the network device, where the indication information is used to indicate a quantity of CSI-RS ports; and the processing module 220 is further configured to determine the first codebook set based on the indication information.

Figure 5:
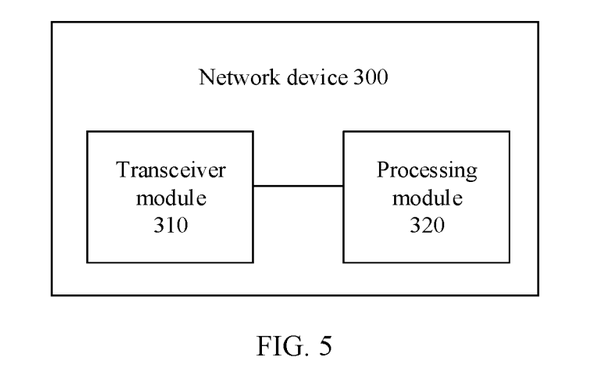
FIG. 5 is a schematic block diagram of a network device according to an embodiment of this application.

FIG. 5 is a schematic block diagram of a network device 300 according to an embodiment of this application. As shown in FIG. 5, the network device 300 includes: a transceiver module 310, configured to send a channel state information-reference signal CSI-RS measurement beam to a terminal device, where the CSI-RS measurement beam is obtained by the network device by weighting a CSI-RS by using a beamforming weight, and the beamforming weight is used to perform beamforming on the CSI-RS, where the transceiver module 310 is further configured to receive a rank indicator and a channel quality indicator that are determined by the terminal device based on the CSI-RS measurement beam; and a processing module 320, configured to weight and transmit a downlink channel based on the rank indicator and the channel quality indicator.

Optionally, the transceiver module 310 is further configured to send indication information to the terminal device, where the indication information is used to indicate a quantity of CSI-RS ports.

Optionally, the processing module 320 is further configured to: determine the quantity of CSI-RS ports based on a quantity of receive antennas of the terminal device; or determine the quantity of CSI-RS ports based on load of a cell in which the terminal device is located; or determine the quantity of CSI-RS ports based on a distance between the network device and the terminal device.

Optionally, the transceiver module 310 is further configured to receive an uplink sounding reference signal SRS sent by the terminal device; and the processing module 320 is further configured to determine the beamforming weight based on the SRS.

Figure 6:
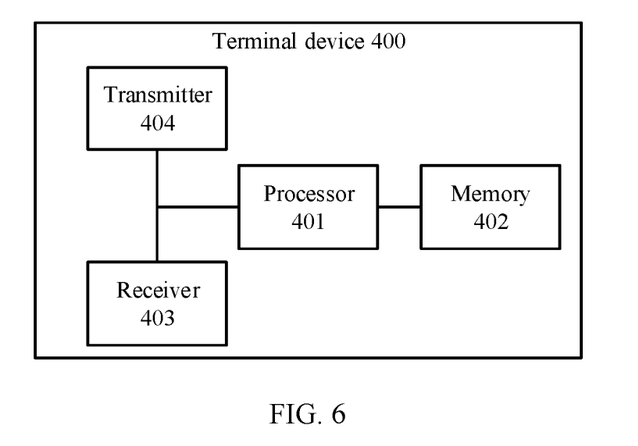
FIG. 6 is another schematic block diagram of a terminal device according to an embodiment of this application.

FIG. 6 is a schematic structural diagram of a terminal device 400 according to an embodiment of this application. As shown in FIG. 6, the terminal device 400 includes a processor 401, a memory 402, a receiver 403, and a transmitter 404. These components are in communication connection with each other. The memory 402 is configured to store an instruction, and the processor 401 is configured to execute the instruction stored in the memory 402, control the receiver 403 to receive information, and control the transmitter 404 to send information.

The processor 401 is configured to execute the instruction stored in the memory 402, the processor 401 may be configured to perform a corresponding operation and/or function of the processing module 220 in the terminal device 200, and the receiver 403 and the transmitter 404 may be configured to perform a corresponding operation and/or function of the transceiver module 210 in the terminal device 200. For brevity, details are not described herein again.

Figure 7:
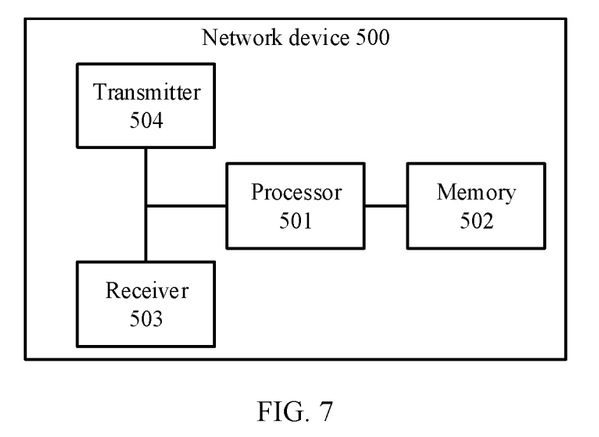
FIG. 7 is another schematic block diagram of a network device according to an embodiment of this application.

FIG. 7 is a schematic structural diagram of a network device 500 according to an embodiment of this application. As shown in FIG. 7, the network device 500 includes a processor 501, a memory 502, a receiver 503, and a transmitter 504. These components are in communication connection with each other. The memory 502 is configured to store an instruction, and the processor 501 is configured to execute the instruction stored in the memory 502, control the receiver 503 to receive information, and control the transmitter 504 to send information.

The processor 501 is configured to execute the instruction stored in the memory 502, the processor 501 may be configured to perform a corresponding operation and/or function of the processing module 320 in the network device 300, and the receiver 503 and the transmitter 504 may be configured to perform a corresponding operation and/or function of the transceiver module 310 in the network device 300. For brevity, details are not described herein again.

Figure 8:
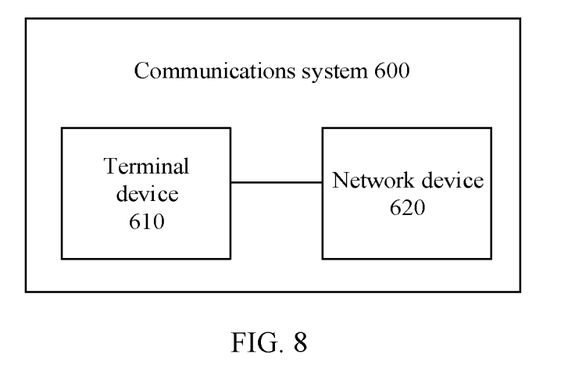
FIG. 8 is a schematic block diagram of a communications system according to an embodiment of this application.

FIG. 8 is a schematic block diagram of a communications system 600 according to an embodiment of this application. As shown in FIG. 8, the communications system 600 includes a terminal device 610 and/or a network device 620. The terminal device 610 may be the terminal device 200 or the terminal device 400, and the network device 620 may be the network device 300 or the network device 500.

An embodiment of this application further provides a system on chip. The system on chip includes an input/output interface, at least one processor, at least one memory, and a bus. The at least one memory is configured to store an instruction, and the at least one processor is configured to invoke the instruction in the at least one memory, to perform operations of the methods in the foregoing aspects.

In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, e.g., a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory in the system and methods described in this specification includes but is not limited to these memories and any memory of another proper type.

It should be understood that "one embodiment" or "an embodiment" mentioned in the entire specification means that particular features, structures, or characteristics related to the embodiment are included in at least one embodiment of this application. Therefore, "in an embodiment" or "in an embodiment" appearing throughout the entire specification does not necessarily refer to a same embodiment. In addition, these particular features, structures, or characteristics may be combined in one or more embodiments by using any proper manner. It should be understood that sequence numbers of the foregoing processes do not mean execution sequences in various embodiments of this application. The execution sequences of the processes should be determined based on functions and internal logic of the processes, and should not be construed as any limitation to the implementation processes of the embodiments of this application.

In addition, the terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only; that is, B may be further determined based on A and/or other information.

All or some of the foregoing embodiments may be implemented by using software, hardware, firmware, or any combination thereof. When the embodiments are implemented by using software, all or some of the embodiments may be implemented in a form of a computer program product. The computer program product may include one or more computer instructions. When the computer program instructions are loaded and executed on a computer, all or some of the procedure or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic disk), an optical medium (e.g., a DVD), a semiconductor medium (e.g., a solid-state disk Solid-State Disk (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A measurement method carried out by a network device, the method comprising:
   sending a channel state information-reference signal (CSI-RS) measurement beam to a terminal device, wherein the CSI-RS measurement beam is obtained by the network device by weighting a CSI-RS by using a beamforming weight, and the beamforming weight is used to perform beamforming on the CSI-RS;
   receiving a rank indicator and a channel quality indicator that are determined by the terminal device based on the CSI-RS measurement beam;
   weighting a downlink channel based on the rank indicator and the channel quality indicator; and
   transmitting, in accordance with the weighting, the downlink channel,
   wherein, before the sending a CSI-RS measurement beam, the method further comprises:
      receiving an uplink sounding reference signal (SRS) sent by the terminal device; and
      determining the beamforming weight based on the uplink SRS by:
         determining an uplink channel matrix based on the uplink SRS, and
         decomposing the uplink channel matrix to obtain the beamforming weight.

2. The method according to claim 1, wherein the method further comprises:
   sending indication information to the terminal device, wherein the indication information indicates a quantity of CSI-RS ports to the terminal device.

3. The method according to claim 2, wherein before the sending indication information to the terminal device, the method further comprises:
   determining the quantity of CSI-RS ports based on at least one of the group consisting of:
      a quantity of receive antennas of the terminal device;
      a load of a cell in which the terminal device is located; and
      a distance between the network device and the terminal device.

4. A network device, comprising:
   a memory storing instructions; and
   a processor coupled to the memory and configured to execute the instructions to carry out a method comprising:
      sending a channel state information-reference signal (CSI-RS) measurement beam to a terminal device, wherein the CSI-RS measurement beam is obtained by the network device by weighting a CSI-RS by using a beamforming weight, and the beamforming weight is used to perform beamforming on the CSI-RS, and
      receiving a rank indicator and a channel quality indicator that are determined by the terminal device based on the CSI-RS measurement beam;
      weighting a downlink channel based on the rank indicator and the channel quality indicator; and
      transmitting, in accordance with the weighting, the downlink channel,
      wherein, before the sending a CSI-RS measurement beam, the method further comprises:
         receiving an uplink sounding reference signal (SRS) sent by the terminal device; and
         determining the beamforming weight based on the uplink SRS by:
            determining an uplink channel matrix based on the uplink SRS, and
            decomposing the uplink channel matrix to obtain the beamforming weight.

5. The network device according to claim 4, wherein the processor is further configured to execute the instructions to carry out:
   sending indication information to the terminal device, wherein the indication information indicates a quantity of CSI-RS ports to the terminal device.

6. The network device according to claim 5, wherein the processor is further configured to execute the instructions to carry out:
   determining the quantity of CSI-RS ports based on at least one of a group consisting of:
      a quantity of receive antennas of the terminal device;
      a load of a cell in which the terminal device is located; and
      a distance between the network device and the terminal device.

7. The network device of claim 4, wherein the decomposing comprises a singular value decomposition (SVD) of the uplink channel matrix.

8. The method of claim 1, wherein the decomposing comprises a singular value decomposition (SVD) of the uplink channel matrix.

* * * * *